Patented Feb. 3, 1953

2,627,475

UNITED STATES PATENT OFFICE 2,627,475

FIRE-RETARDANT PAINT

Ralph W. Craig, Painesville, Ohio, assignor to Diamond Alkali Company, Cleveland, Ohio, a corporation of Delaware No Drawing. Application July 31, 1948,
Serial No. 41,899

3 Claims. (Cl. 106—15)

This invention relates to surface protective coatings and more particularly relates to paints having improved fire-retardant properties and incorporating inexpensive and easily available ingredients to produce such properties.

Proposals for production of fire-retardant paints in the prior art are very numerous. Some of these proposals have resulted in materials of considerable success as fire-retardant surface protection compositions. Notable examples of prior art materials for this purpose are combinations with other paint ingredients of antimony oxide and highly chlorinated organic materials, such as chlorinated paraffin having sufficient chlorine combined therewith so that the paraffin no longer partakes of its paraffinic nature but rather is a resinous type solid. In general, such surface protecting materials have been highly practicable and widely used in the prior art and are often well-suited both to interior and exterior paint applications. Unfortunately, however, particularly in the case of antimony oxide, the expense of this ingredient in a paint is often prohibitive. Moreover, antimony oxide is a relatively scarce commodity whereby broadened use of flame-resistant paints is threatened.

Coupled with this shortage of antimony oxide and equivalent compounds for this purpose has been an increasing demand upon the part of public authorities that public buildings and public assembly places employ only materials which have substantial fire-retardant properties and that paints applied in such public places have similar properties. The tendency to specify such materials, moreover, has reflected itself in laws passed in sundry State legislatures, which have demanded that public buildings, and in some cases other types of buildings, have only fire-retardant materials incorporated therein and that these materials be decorated with fire-retardant surface protective agents, such as paints. The art, therefore, has sought a substitute for the expensive and scarce antimony type paints which would reduce the cost of fire protective surface coatings in such applications, while still providing substantial fire-retardant properties. However, various proposals which have been made in the prior art directed to this end have unfortunately failed of success and until the present invention, no fire protective paint composition was known which had properties comparable to antimony oxide paints and especially which could be provided at a cost considerably reduced over such materials.

The present invention contemplates the provision of a fire-retardant paint material, which has fire-retardant properties substantially equal to, and in some cases in excess of, those properties possessed by antimony oxide paints, while providing these properties with materials of considerably less cost and considerably greater availability than has been the case with the antimony oxide paints. The compositions of the present invention include, in addition to the standard ordinary paint-containing ingredients, and in addition to highly chlorinated organic materials of the general type mentioned above, a considerable proportion of barium sulfate as the only additional fire-retardant ingredient in the paint composition.

It is appreciated that proposals have heretofore been made to incorporate barium sulfate in paint compositions especially as an inert filler or extender. However, such proposals have either failed to suggest that the paint compositions shall be of the fire-retardant character and have, in fact, not provided fire-retardant properties due to failure to include other necessary ingredients, or have included the proposal to incorporate barium sulfate as a filler in flame-retardant paints wherein the principal flame-retardant ingredients comprised antimony oxide and similar 5th group periodic table salts or oxides. It has not heretofore been proposed to employ the combination of highly chlorinated organic substances and barium sulfate as the sole essential flame-retardant ingredients in a surface protective material. It is an important feature of this invention to provide a flame-retardant paint of properties equivalent to or better than prior art materials employing antimony oxide, which shall include those materials as the only essential flame-retardant ingredients of the paint composition.

The composition of the present invention includes in general vehicles, pigments, and solvents and may also include such secondary materials as driers, plasticizers, metallic soap, and antioxidants.

The vehicle of the composition of the present invention may suitably be selected from various well-known drying components of paint, particular examples of such materials being alkyd resins, whether modified by well-known modifiers such as natural or synthetic oils or resins or not, oleoresinous materials such as combinations with suitable oils, such as linseed, of natural gums or wood rosin, and natural or synthetic drying oils, such as vegetable oils either raw or processed, viz. linseed oil. A vehicle chosen from any of these broad general groups may comprise entirely "solids," i. e., may have no components which are removed as by evaporation or the like from a paint upon the spreading of the same on a surface to be protected and drying, or may suitably be combined with sundry volatile solvents, such as mineral spirits, and the like, in which case the vehicle will of necessity be less than 100% solids. Moreover, it is a feature of the present invention to include in the vehicle solids a percentage of highly chlorinated organic material.

The highly chlorinated organic material may comprise any higher molecular weight chlorinated organic substance containing preferably between about 60-63% and 80% of chemically combined chlorine, such as chlorinated aliphatic or cycloaliphatic compounds containing more than 8 carbon atoms, examples of which are paraffin hydrocarbons, waxes, fats, oils, higher fatty acids, higher fatty acid esters, and the like. More particularly preferred in this connection are solid chlorinated aliphatic materials having more than 8 carbon atoms. Chlorinated paraffins having an average of from 17 to 35 carbon atoms and suitably of the order of 24 carbons average are particularly useful in this connection when containing between about 63% to 80% of chemically combined chlorine, i. e., when they are substantially solids at room temperatures. These materials are preferably incorporated in the final paint to an extent that the vehicle solids, the ratio of which to the remainder of paint ingredients is set forth below, will comprise 25% or more of such chlorinated material. It has been found particularly advantageous to employ an amount as high as 50% of chlorinated materials with respect to other vehicle solids.

In general, any of the above-mentioned vehicles or any other known vehicle may suitably be used in the paint of this invention with the stated proportion of highly chlorinated materials combined therewith. It has been found, however, that combinations of alkyd resin vehicle with chlorinated materials, which incorporate in the finished paint a suitable proportion of barium sulfate as herein disclosed, are in general preferable as the paints derived therefrom not only are somewhat superior from a general surface protection standpoint, but also possess somewhat greater fire-retardant properties. Moreover, the oleoresinous type vehicle has been found to be the next best from the standpoint of fire-retardancy, and the drying oil type vehicle, though providing, when combined with suitable proportions of chlorinated material and barium sulfate, a paint of marked fire-retardant properties, has the least attractive fire-retardancy of the three classes of paints incorporating these three general classes of vehicles.

The pigments to be employed in the present paints will, of course, depend primarily upon the ultimate color desired, the term "pigment" in the disclosure of the present invention being taken to include materials such as extenders, inert fillers, solid diluents, and the like. As noted above, a portion of the pigment content of the paint consists of barium sulfate, it having been found preferable to employ between 30% and 50% of the total pigment present as barium sulfate, a particularly preferred amount being about 40% of total pigment.

In addition, there may be present, as noted above particularly where the vehicle is of the alkyd or oleoresinous type, a suitable amount of solvent to produce the desired consistency in the liquid paint, such as mineral spirits of a boiling range of 100-260° C. being suitable. As no criticality ties to the particular solvent used and as sundry solvents may be found in standard texts on the subject, no others need be disclosed herein. It will further be understood, of course, that in the event that drying oils and the like are employed in the paint, the amount of solvent may be reduced considerably or perhaps eliminated entirely in accordance with well-understood paint industry practices and in such case, the vehicle will comprise 100% solids, as is well-understood in the terminology of the paint art.

The secondary components of the paint composition may, as pointed out above, include such materials as driers, which may suitably comprise metal organo salts, such as metal naphthenate of the general character of lead, cobalt, or manganese naphthenate, and other well-known materials generally employed for this purpose. In addition, optionally may be included plasticizers, metallic soaps, and antioxidants for their well-known function in the paint composition, none of which functions affect either adversely or advantageously the flame-resisting elements of the composition.

An additional component of the paints of this invention which may, if desired, be optionally included are stabilizers for the chlorinated paraffin included in the paint composition, especially where the ultimate painted surface may be subjected in use to relatively elevated temperatures of an order of well below flame temperatures. Such stabilizers are suitably substantially without stabilizing effect upon the chlorinated paraffin at flame temperatures, whereby the release of HCl and its concomitant fire-retardant influence may be had. At temperatures below flame temperatures, however, the chlorinated paraffin stability may at times be adversely affected and to that end, it is desirable to include stabilizing substances of a general character of HCl acceptors, a preferred example of which is calcium carbonate, this material being particularly useful in this connection since, in addition to its stabilizing influence, it contributes generally to other desired properties of the paint in a well-known manner.

As noted above, specific ratios of chlorinated material to other vehicle solids are preferred in the paint of this invention and moreover, specific ratios of barium sulfate or barytes to other pigment materials are also preferred. In addition, it has been found that a ratio of pigment materials, where the expression "pigment," as noted above, includes extenders, inert fillers, and the like, to vehicle or binder material where the expressions "vehicle" or "binder" are synonymous and include all of the vehicle materials but not the solvent which is not present in the paint as applied to a surface, of between 1.25:1 and 2:1 by volume, 1.5:1 being a particularly desirable relationship, is in general preferred. Moreover, it is noted that where ratios of pigment to binder as low as 1.25:1 by volume are employed, it is in general preferable to employ a higher percentage of highly chlorinated material than the minimum operable percentage set forth above, such a percentage as 35% or more of chlorinated material in the total vehicle solids by weight being in general preferred, where the lower ratio of pigment to binder is employed.

The flame-retardant character of the paints of the present invention may be tested in various ways in order to show that the paints of the present invention exhibit improved fire-retardancy over ordinary paints of commerce and in particular exhibits fire-retardancy of the general order of and in some cases improved over fire-retardant paints in which antimony oxide is present. In general, the method of testing paints of this character has been to prepare panels which have been coated with one or two coats of the paint compositions and have been suitably allowed to dry for a sufficient period of time, after which they are burned under controlled conditions, the extent of protection of surface directly traceable to protective coating being observed.

More particularly, to inform those skilled in the art of the manner in which the flame-retardant character of the present paints may be tested, and so that the paint of the present invention may suitably be reproduced and compared with other materials of fire-retardant character, the following method of testing the paint of the present invention is set forth:

Red cedar shingles, 5 inches wide and 16 inches long, are selected as test panels. An area of 3 x 16 inches is painted by brush with the fire-retardant paint to be examined, leaving an area of 2 x 16 inches uncoated. Where one coat is applied to the shingle, the panel is permitted to air-dry for 30 days. Where two coats are applied, a space of 5 days intervenes between the two coats. At the end of the drying period, the panels are tested as follows: The test shingle is held in a vertical position by means of clamps with the thin end of the shingle at the bottom. A lighted Bunsen burner with a 2-inch blue cone flame is placed under the uncoated edge of the test shingle. The shingle is lit with the tip of the Bunsen burner flame just touching it for a period of 30 seconds, after which the flame is removed. The shingle is permitted to burn until it extinguishes itself and the weight of the undestroyed area comprising the treated area is compared with the weight of that portion of the shingle prior to burning. Where less than 5% of the weight is lost in the course of the burning of the untreated area, the test is considered to be excellent.

The paints of the present invention pass this test with the same general character of excellence as those paints comprising antimony oxide and other flame-resistant materials. Moreover, it has been found that the two-coat system comprises an improvement in fire-retardancy in both the antimony oxide paint and the paint of the present invention.

In order to inform those skilled in the art more particularly of the manner in which the paints of the present invention may be prepared, the following examples are offered as typical, it not being intended to limit the invention by the details of the examples, but merely to disclose the invention more fully in order to enable the invention to be practiced.

*Example I*

A composition comprising the following ingredients is suitably milled until a homogeneous mixture is obtained:

|  | Lbs. | Gallons |
|---|---|---|
| Anatase Titanium Dioxide | 100 | 2.85 |
| 35% Leaded Zinc Oxide | 429 | 8.85 |
| Magnesium Silicate | 100 | 4.20 |
| Barytes | 510 | 14.25 |
| Chlorinated Paraffin (Average C$_{24}$) Containing about 70% Chemically Combined Chlorine | 238 | 17.20 |
| Alkali Refined Linseed Oil | 188 | 24.20 |
| Kettle Bodied Linseed Oil | 50 | 6.25 |
| Mineral Spirits | 135 | 20.80 |
| 24% Lead Naphthenate | 3.8 | .40 |
| 6% Manganese Naphthenate | 1.9 | .20 |

Shingles painted with this composition and tested in accordance with the test set forth above show excellent results in that less than 10% of the weight of the shingle is lost in the test period.

*Example II*

The following ingredients are suitably combined in a paint mill until the same are absolutely homogeneous:

|  | Lbs. | Gallons |
|---|---|---|
| Titanium Dioxide | 270 | 7.7 |
| Barium Sulfate | 482 | 13.4 |
| Precipitated Calcium Carbonate | 197 | 8.9 |
| Asbestine | 122 | 5.1 |
| Alkyd Resin Comprising 70% of Vehicle Solids | 229 | 29.02 |
| Chlorinated Paraffin Having 70% of Chemically Combined Chlorine | 68 | 5.06 |
| Mineral Spirits | 191 | 29.45 |
| Driers | 10.3 | 1.25 |

It will be recognized that in this formulation, the total vehicle solids comprise 30% of chlorinated material and the barium sulfate comprises 40% by weight of the total pigment present. This material, when tested in accordance with the test procedure set forth above, is superior with respect to fire-retardancy to the paint of Example I and compares favorably with antimony-containing paints.

*Example III*

The following ingredients are suitably combined in a paint mill until absolutely homogeneous and then treated in accordance with the test procedure cited above, whereby similar fire-retardant properties are shown to those examples hereinabove cited:

|  | Lbs. | Gallons |
|---|---|---|
| Titanium Dioxide | 270 | 7.72 |
| Barium Sulfate | 482 | 13.42 |
| Precipitated Calcium Carbonate | 200 | 9.06 |
| Magnesium Silicate | 120 | 5.05 |
| Alkyd Resin Comprising 70% of Vehicle Solids | 178 | 22.60 |
| 70% Chlorinated Paraffin (60% Solids) in Solvent, 80% Mineral Spirits, 20% Toluol by Weight | 209 | 21.60 |
| Mineral Spirits | 185 | 28.50 |
| Driers | 10.3 | 1.25 |

*Example IV*

The following ingredients are blended to form a paint:

|  | Lbs. | Gallons |
|---|---|---|
| Titanium Dioxide | 270 | 7.72 |
| Barytes | 470 | 13.20 |
| Precipitated Calcium Carbonate | 80 | 3.60 |
| Asbestine | 122 | 5.14 |
| Alkyd Resin—70% Solids | 178.4 | 22.60 |
| Chlorinated Paraffin Having 70% Chemically Combined Chlorine—100% Solids | 124.8 | 9.00 |
| Mineral Spirits | 265 | 40.75 |
| Lead Naphthenate—24% | 8.7 | 1.05 |
| Cobalt Naphthenate—6% | 1.1 | .13 |
| Manganese Naphthenate—6% | 0.05 | .07 |

It will be observed that the pigment to vehicle or binder ratio of this example is 1.25:1 and in view thereof, the proportion of chlorinated material in the vehicle solids is suitably maintained at or near the maximum amount of such material, as set forth hereinbefore. The paint of this example is found to possess fire-retardancy of the order of the paints of Examples II and III.

While there have been described various embodiments of the invention, the products described are not intended to be understood as limiting the scope of the invention at it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A fire-retardant paint composition containing as its essential fire-retardant ingredients a solid, highly chlorinated aliphatic compound having more than 8 carbon atoms and containing between 63% and 80% of chemically combined chlorine, and barium sulfate, said highly chlorinated aliphatic compound amounting to at least 25% by weight of the total of the vehicle solids of said paint, said barium sulfate amounting to from 30%–50% by weight of the total pigment present in said paint, and the ratio of the volume of the total of said pigment to the volume of the total of said vehicle solids being substantially within the range of 1.25:1 to 2:1.

2. A fire-retardant paint composition as claimed in claim 1 in which the solid, highly chlorinated aliphatic compound is a chlorinated paraffin having from 17–35 carbon atoms per molecule and contains from 63%–80% of chemically combined chlorine, and in which the ratio of the volume of the total of said pigment to the volume of the total of said vehicle solids is substantially 1.5:1.

3. A fire-retardant paint composition as claimed in claim 1 in which said solid, highly chlorinated aliphatic compound is a chlorinated paraffin having an average of 24 carbon atoms in the carbon chains thereof and containing 70% of chemically combined chlorine, the amount of said chlorinated paraffin is from 35%–50% by weight of the total vehicle solids of said paint, the barium sulfate is substantially within the range of 40%–50% by weight of the total pigment present in said paint, and in which the ratio of the volume of the total of said pigment to the volume of the total of said vehicle solids is substantially 1.5:1.

RALPH W. CRAIG.

REFERENCES CITED

The following references are of record in the file of this patent:

UNITED STATES PATENTS

| Number | Name | Date |
|---|---|---|
| 2,299,612 | Clayton et al. | Oct. 20, 1942 |
| 2,328,250 | Balassa | Aug. 31, 1943 |
| 2,378,714 | Leatherman | June 19, 1945 |

FOREIGN PATENTS

| Number | Country | Date |
|---|---|---|
| 821,596 | France | Dec. 8, 1937 |

OTHER REFERENCES

Official Digest Federation Paint & Varnish Production Clubs, Nov. 1946, pages 512–517.

Official Digest-Fed. Paint & Varnish Production Clubs, July 1948, pages 522–526 (article by K. S. Wade—Chlorowax as a Paint Ingredient).